(12) United States Patent (10) Patent No.: US 12,683,950 B2
Lerch et al. (45) Date of Patent: Jul. 14, 2026

(54) SHARING SYSTEM ACCESS USING A DEVICE

(71) Applicant: Apple Inc., Cupertino, CA (US)

(72) Inventors: Matthias Lerch, San Francisco, CA (US); Sven J. Hofmann, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 18/533,600

(22) Filed: Dec. 8, 2023

(65) Prior Publication Data

US 2024/0291809 A1 Aug. 29, 2024

Related U.S. Application Data

(60) Provisional application No. 63/487,130, filed on Feb. 27, 2023.

(51) Int. Cl.
*H04L 9/40* (2022.01)

(52) U.S. Cl.
CPC ........ *H04L 63/0823* (2013.01); *H04L 63/062* (2013.01); *H04L 63/107* (2013.01); *H04L 63/20* (2013.01)

(58) Field of Classification Search
CPC . H04L 63/0823; H04L 63/062; H04L 63/107; H04L 63/20
See application file for complete search history.

(56) References Cited

U.S. PATENT DOCUMENTS

| | | | | |
|---|---|---|---|---|
| 9,503,269 | B2 * | 11/2016 | Himawan | H04L 9/3268 |
| 11,128,478 | B2 | 9/2021 | Galdo et al. | |
| 11,522,695 | B2 * | 12/2022 | Hariharan | H04L 63/0492 |
| 2007/0168657 | A1 * | 7/2007 | Carro | G06F 21/645 |
| | | | | 713/176 |
| 2011/0197064 | A1 * | 8/2011 | Garcia Morchon | H04L 9/3093 |
| | | | | 713/168 |
| 2015/0372824 | A1 * | 12/2015 | Himawan | H04L 63/0823 |
| | | | | 713/156 |
| 2020/0195633 | A1 * | 6/2020 | Sham | H04W 12/069 |
| 2021/0028928 | A1 * | 1/2021 | Hariharan | H04L 63/10 |
| 2021/0250355 | A1 | 8/2021 | Galdo et al. | |
| 2023/0269093 | A1 * | 8/2023 | Ben-Ari | G06F 21/57 |
| | | | | 713/175 |
| 2024/0129320 | A1 * | 4/2024 | Bernsen | H04L 63/105 |

* cited by examiner

*Primary Examiner* — Cheng-Feng Huang
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to sharing an access credential. In various embodiments, sharee device receives an access credential shared by a sharer device to obtain access to a system. The sharee device determines a policy based on a server-based device (SBxD) certificate included in the access credential and performs an action in accordance with the determined policy. In some embodiments, the policy specifies a restricted set of access rights for the system. The sharee device presents, in accordance with the policy, the access credential to the system. In some embodiments, the action includes the sharee device providing information to a remote server. In some embodiments, the sharee device identifies an access credential class defined by class information included in the access credential and performs an action in accordance with the determined policy and the identified access credential class.

20 Claims, 7 Drawing Sheets

*Credential Sharing System*
10

*Credential Sharing System*

*10*

*Shared Access Credential 122 w/ SBxD Certificate 124*

*120*

*Sharer*

*130*

*Sharee*

*Policy*

*134*

*122*

*110*

*Accessible System*

600

610

Receive Access Credential Shared by Sharer
Device to Obtain Access to System

620

Determine Policy Based on SBD Certificate
Included in Access Credential

630

Perform Action in Accordance with Determined
Policy

SHARING SYSTEM ACCESS USING A DEVICE

PRIORITY

The present application claims priority to U.S. Prov. Appl. No. 63/487,130, entitled "Sharing System Access Using a Device," filed Feb. 27, 2023, which is incorporated by reference herein in its entirety.

BACKGROUND

Technical Field

This disclosure relates generally to electronic security, and, more specifically, to cryptographic techniques for using a device to gain and control access to/from another system.

Description of the Related Art

Traditional techniques for gaining access to functionality of a system (e.g., physical access or accessing some function of the system) include use of physical keys or electronic key fobs. For example, a person attempting to enter a vehicle may present a radio-frequency identification (RFID) key fob to a reader in order to authenticate the user. Carrying such traditional keys may be inconvenient and may allow malicious entities to gain access if a key is lost or stolen. In other cases, a password, secret code (e.g., personal identification number (PIN)), or other secret known to an authorized person can be used to permit access. Remembering this information, however, can be a challenge.

DETAILED DESCRIPTION

Figure 1:
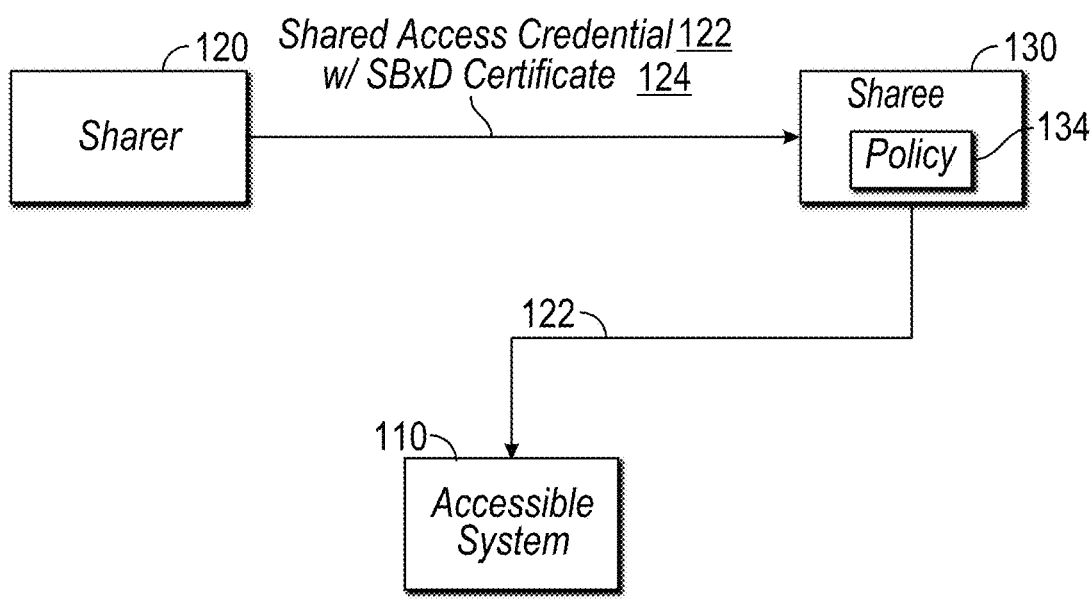
FIG. 1 is a block diagram illustrating an example of a credential sharing system.

In some instances, the owner of a system may wish to permit another individual to access the system. If the system supports use of an electronic access credential (as opposed to a physical key or fob), the owner may be able to share an access credential from an owner device to a device associated with that individual. For example, an owner's phone might be used to send a friend's phone an access credential for unlocking the owner's system. While sharing an access credential may, in some instances, involve devices belonging to individual people, there may be other instances in which one or more of the participating devices belongs to an entity other than a person. For example, a rental car company may own a fleet of vehicles and operate a server that can share access credentials to the mobile devices of its renters. As will be discussed below, it may be desirable for devices participating in a credential sharing exchange to know whether one or more participating devices are associated with an entity other than an individual, so a different set of actions can be performed. For example, if a user's mobile device is receiving an access credential for a rental vehicle (as opposed to an access credential from a friend), it may be desirable to have the mobile device present a different user interface (or perform other actions), which could include helpful information pertinent to the rental vehicle.

The present disclosure describes embodiments in which a shared access credential includes additional information about participating devices in order to enable greater functionality. As will be discussed below, a sharee device may receive an access credential shared by a sharer device to obtain access to a system. The sharee device may determine a policy based on a server-based device (SBxD) certificate included in the access credential and perform one or more actions in accordance with the determined policy. In various embodiments, the SBxD certificate is a certificate that identifies the sharer device as being a server (as opposed, for example, to a mobile device) and certifies a public key pair corresponding to an identity of the server—the public key pair being used to share the access credential. The SBxD certificate may be referred to below as a server-based owner device (SBOD) certificate if the sharer device is a device belonging to an owner of the system such as a company that owns multiple short-term rental properties and shares access to renters. The SBxD certificate may alternatively be referred to below as a server-based friend device (SBFD) certificate if the sharer device is a device belonging to an entity granted authority by the owner such as a vehicle service department of a dealership that has been granted authority by a vehicle owner to share an access credential to one of its employees that is servicing the vehicle.

As will be discussed in greater detail below, using SBxD certificates may allow for a greater user experience for a recipient of a shared access credential such as a renter being able to access a rental property without meeting someone in person to obtain a physical key. Using SBxD certificates may also allow greater owner control such as an owner restricting a vehicle's capabilities when it is accessed by an employee of a vehicle service department.

Turning now to FIG. 1, a block diagram of a credential sharing system 10 is depicted. In the illustrated embodiment, credential sharing system 10 includes accessible system 110, sharer 120, and sharee 130, which includes a policy 134. In some embodiments, credential sharing system 10 may be implemented differently than shown. For example, system 10 may include one or more additional accessible systems 110, sharer 120, or sharee 130; system 10 may also include additional servers including relay servers, original equipment manufacturer (OEM) servers, information collecting servers associated with accessible system 110, sharer 120, or sharee 130. While various embodiments are discussed below in which certificate 124 is for a server-based device, other embodiments are also contemplated in which certificates 124 are included in credentials 122 for non-server-based devices.

Accessible system 110 is any suitable system that is secured using an electronic access credential such as access credential 122 discussed below. In some embodiments, accessible system 110 is a vehicle such as an aircraft, marine vessels, recreational vehicles (RVs), automobiles, buses, motorbikes, scooters, ebikes, railed vehicles, spacecraft, robotic devices, trucks, trailers, cranes, caterpillars, heavy engines, etc. In some embodiments, accessible system 110 is a structure with an access control system such as a house, hotel, rental property, garage, office building, store, transit access control, or other forms of physical locations. In some embodiments, accessible system 110 is some other form of secured property such as a safe, mailbox, home automation devices, internet of things devices, controllers, various other devices noted below with respect to FIG. 7, etc. Access credential 122 may be implemented using any of various techniques. In some embodiments, access credential 122 may include a shared secret that can be presented to accessible system 110 such as a signed token. In various embodiments discussed below, access credential 122 may include a public key pair including a private key that can be used in a challenge response exchange in which the private key is used to sign a challenge issued by system 110. In some embodiments, access credential 122 is implemented in a manner that complies with a known standard such as Car Connectivity Consortium®.

Sharer 120 is any suitable device/server that has been granted authority to share an access credential 122 associated with system 110. In some instances, this authority is due to sharer 120 belonging to an owner of accessible system 110—thus, sharer 120 may be referred to below as an "owner device." In other instances, this authority may be granted to sharer 120 as it belongs to someone granted authority by the owner (or someone having some other vested interest such as a manufacturer of system 110)—thus, sharer 120 (or sharee 130) may be referred to below as a "friend device." In some embodiments, sharer 120 is a device belonging to a private individual, which may have physical access to accessible system 110. For example, sharer 120 may be a mobile device that can be physically presented to accessible system 110 such as a mobile phone, wearable device, tablet computer, handheld computer, music player, laptop or notebook computer, personal data assistant (PDA), consumer device, etc. In other embodiments, sharer 120 is a device that is remotely located from system 110 and may belong to an entity with multiple accessible systems 110 (e.g., a fleet of vehicles). For example, sharer 120 may be a server system, desktop computer, mainframe computer system, workstation, network computer, etc. Sharer 120 may also include any suitable wireless or wired interfaces such as near field communication (NFC), Zigbee®, Bluetooth®, Wi-Fi®, cellular interface, Ethernet, etc. To be granted the authority to share an access credential 122, sharer 120 may perform an initial pairing operation with accessible system 110, which, in some embodiments, may include sharer 120 establishing a public key pair trusted by accessible system 110 and certified by an SBxD certificate 124 discussed below.

Sharee 130 is any suitable device/server that has been shared an access credential 122, which it may use to obtain access to system 110. In some embodiments, sharee 130 belongs to a private individual, which may have physical access to accessible system 110, such as an owner's friend, a renter, a valet, etc. In other embodiments, sharee 130 is a device that is remotely located from system 110 such as a server operated by a company that performs some service with respect to system 110. Accordingly, sharee 130 may be implemented using any of the devices noted above with respect to sharer 120 (or discussed below with FIG. 7) and may incorporate any suitable interface. Sharee 130 may also receive credential 122 using any of various techniques. In some embodiments, sharee 130 may receive access credential 122 via an ad-hoc wireless network that has been temporarily established to exchange access credential 122 when sharee 130 and sharer 120 are proximal to one another. In various embodiments, sharee 130 may receive access credential 122 via a messaging service such as short message service (SMS), email, iMessage®, WhatsApp®, etc. In some embodiments, sharee 130 may receive access credential 122 using a relay server. For example, sharee 130 may receive a message including a uniform resource locator (URL) identifying where to obtain access credential 122 from the relay server.

As noted above, it may be desirable to include information in a credential 122 about the credential's origin as users of sharer 120 and sharee 130 may not, for example, want to treat a friend in the same manner as a valet driver. In the illustrated embodiment, this information is included as an SBxD certificate 124.

In various embodiments, SBxD certificate 124 is a certificate indicative of sharer 120 being a server (as opposed, for example, to a mobile device). SBxD certificate 124 can include an identity associated with sharer 120 and certify a public key pair corresponding to the identity—the key pair being used to share access credential 122. In various embodiments discussed below, SBxD certificate 124 is referred to below as a server-based owner device (SBOD) certificate if sharer 120 is a device belonging to an owner of system 110 such as a company that owns a fleet of vehicles. SBxD certificate 124 may alternatively be referred to below as a server-based friend device (SBFD) certificate if sharer 120 is a device belonging to an entity granted authority by the owner such as a delivery service wanting to drop off a package at system 110. In various embodiments, certificate 124 may be X.509 compliant. In some embodiments, shared access credential 122 may include additional information associated with credential 122's origin such as a credential class information identifying a particular class of credential 122 as will be discussed below with subsequent figures. Based on the SBxD certificate 124 included in a shared access credential 122 (or the lack of a certificate 124), sharee 130 may determine a policy 134 associated with the credential 122.

Policy 134 is a collection of one or more criteria associated with an access credential 122 that governs what actions a sharee 130 performs with respect to credential 122. These actions may generally include actions performed with respect to accessible system 110, sharer 120, a user of sharee 130, remote servers not depicted in FIG. 1, etc. In some embodiments, policy 134 is specific to a particular entity associated with access credential 122. For example, policy 134 may include criteria for displaying a particular user interface, which may include a logo associated with the entity along with various metadata. In some embodiments, policy 134 is specific to a particular class of credential 132. Accordingly, policy 134 may define criteria for particular actions to be taken if a particular class of credential 122 is received. In some embodiments, sharee 130 may include a default policy 134 that is selected when no certificate 124 is present in a given access credential 122. For example, sharee 130 may present a generic user interface defined by the default policy 134 when no certificate 124 is included in a received access credential 122. Sharee device may also obtain policy 134 in any of various ways. In some embodiments, policy 134 may be provisioned via a prior enrollment such as when an application associated with credential 122 is installed. In some embodiments, policy 134 may be provisioned at manufacture of sharee 130 (or when an operating system is installed on sharee 130). In some embodiments, policy 134 may be received with credential

122. For example, certificate 124 may include a URL referring sharee 130 to a server where policy 134 can be downloaded.

Various exemplary use cases for system 10 will now be discussed with FIGS. 2 and 3.

Figure 2:
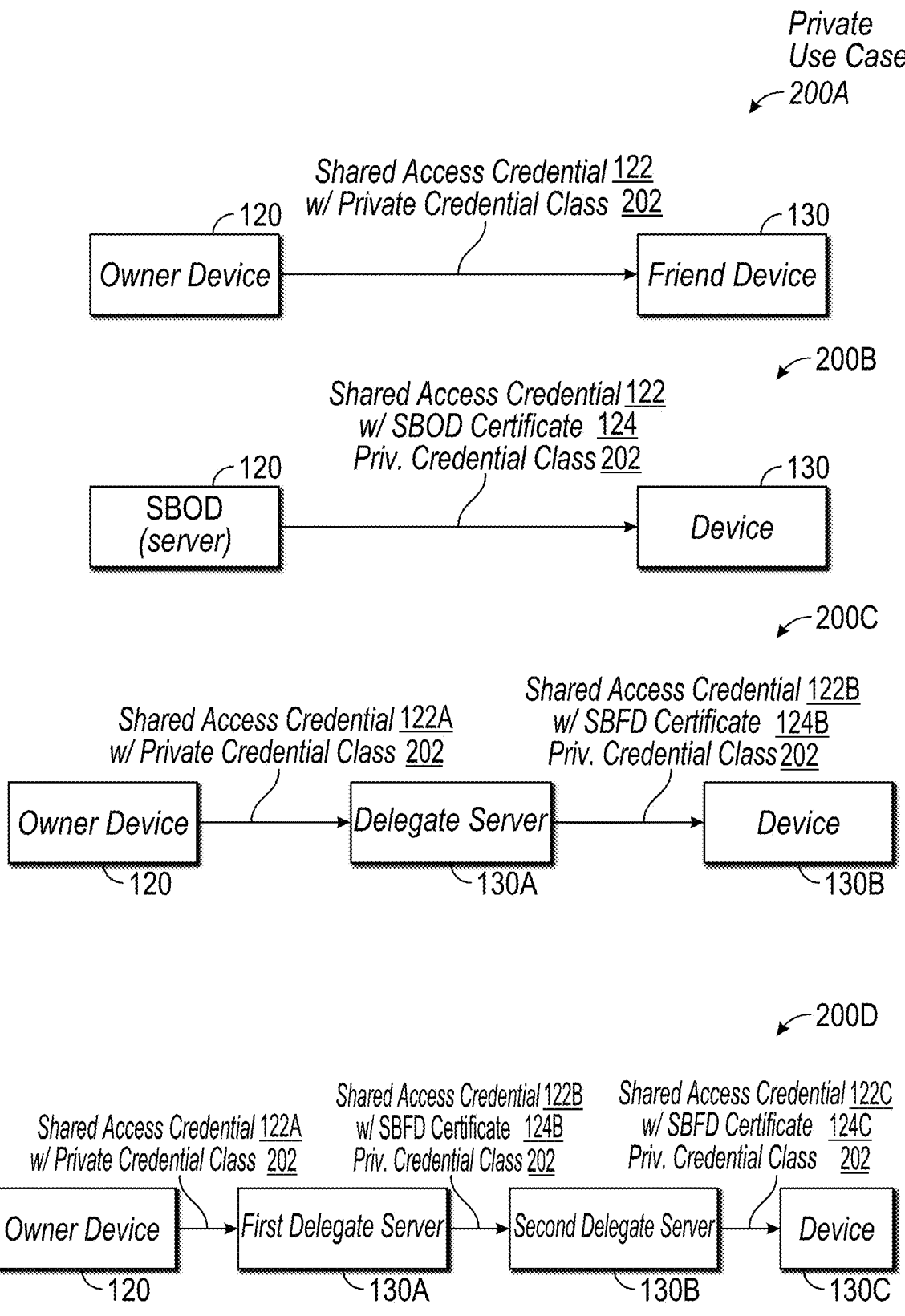
FIG. 2 is a block diagram illustrating examples of private use cases associated with the credential sharing system.

Turning now to FIG. 2, various examples of private use cases 200A-D are shown. In some embodiments, private use cases 200 pertain to cases in which a sharer 120 is associated with a private owner in contrast to a fleet owner discussed with FIG. 3. In other embodiments, however, techniques described with respect to use cases 200 may be applicable to other types of use cases. In some embodiments, use cases 200 may be implemented differently than shown.

In private use case 200A, an owner device 120 that is not a server-based owner device shares an access credential 122 with a friend device 130. For example, an owner of system 110 may use their phone 120 to send a credential 122 to a child's phone 130 to enable the child access to system 110. As shown, credential 122 may not include a SBxD certificate 124 as device 120 is not server in this exemplary use case. In other embodiments, however, credential 122 may include a certificate 124 for a non-server-based device. Based on the omission of a certificate 124, friend device 130 may, in some embodiments, determine a default policy 134 that specifies, for example, a default user interface to present to a user device 130 when viewing credential 122 and interacting with system 110—along with other default actions that may be performed. As also shown, credential 122 may include a credential class 202 identifying credential 122 as having a "private" class, which may affect what policy 134 is determined and thus what actions are performed by friend device 130. Accordingly, in such an embodiment, actions performed based on private credential class 202 may differ from other classes 202 such as a fleet credential class 202 discussed below with FIG. 3.

In private use case 200B, an owner device 120 is a server that conveys an access credential 122 including a SBOD certificate 124 to a device 130. For example, a manufacturer of system 110 may operate server 120, which provides a web-based interface that enables owners to share credentials 122 with devices 130 (as opposed to using their own devices). In the illustrated embodiment, credential 122 further includes private credential class 202 identifying credential 122 as having a private class. In response to receiving credential 122, device 130 may determine a policy 134 that specifies, for example, a logo of the manufacturer and system specific information to be displayed in a user interface of a credential manager application for managing use of credential 122. In some embodiments, this policy 134 may restrict what credentials 122 device 130 may accept such as credentials 122 associated with a particular geographic region, manufacturer, etc. (e.g., to prevent a user of device 130 from being spammed). Device 130 may then determine to reject access credentials 122 not in compliance with the policy 134. In some embodiments, policy 134 may specify other criteria, which may be associated with particular user experience objectives, business objectives, billing objectives, etc. Being a private credential class 202, policy 134 may allow device 130 to perform a wider range of actions in this exemplary use case 200B than other classes 202.

In private use case 200C, an owner device 120 shares an access credential 122A with a delegate server 130A, which, in turn, shares an access credential 122B to a device 130B. Such a use case 200C may be applicable, for example, if a vehicle owner wants to grant a vehicle service department access to a vehicle. Accordingly, the owner's personal device 120 may share a credential 122A with a delegate server 130A operated by the vehicle service department (or operated by some other company working with the vehicle service department). As this device 120 is not a server, device 120 may not include an SBOD certificate 124 but includes a private credential class 202. Based on this information, delegate server 130A may determine a corresponding policy 134, which may allow server 130A to share credentials 122B with restricted access privileges such as restricting a vehicle's use to a geographic region associated with the service department. Delegate server 130A may then issue corresponding credentials 122B including a SBFD certificate 124 as server 130A has been authorized by the vehicle owner device 120. In some embodiments, the SBFD certificate 124 includes an identity of the sharer device 130 associated with the service department and indicates that the sharer device 130 is a delegate server authorized by an owner device of the system to grant limited access to the system. Delegate server 130A may also propagate private credential class 202 from credential 122A to credential 122B. Based on the included SBFD certificate 124B and class 202, device 130B may determine a policy 134 that restricts device 130's actions in accordance with any restrictions placed by the delegate server 130A. In such an example, this policy 134 might also indicate that device 130 should provide information about an access event using the shared access credential 122, which could be used to indicate to owner device 120 that a vehicle technician has accessed the vehicle and started servicing it.

Another example of use case 200C may include a restaurant offering a valet service in which a device 120 shares an access credential 122A with a delegate server 130A associated with the restaurant, which, in turn, shares an access credential 122B with one of its valet drivers. Based on a determined policy 134, server 130A may place restrictions on device 130 such as limiting a driver's speed and travel distance, barring the valet driver from sharing another credential 122 associated with the vehicle, etc. In response to receiving credential 122B, device 130 (or accessible system 110) may enforce these restrictions via a corresponding policy 134. In this example, the policy 134 may also include a criterion for device 130 to notify a remote server of a location where the vehicle was parked, so the server can covey a corresponding push notification of the location to owner device 120.

As yet another example, owner of a short-term rental property may want to use a service that helps find potential tenants. Accordingly, owner device 120 may share a credential 122A to a delegate server 130A associated with the rental service. In response to a renter agreeing to rent the property, the delegate server 130A may issue a corresponding credential 122B to the renter to obtain access to the property. In response to receiving credential 122A, delegate server 130A may determine, based on a policy 134, to share a credential 122B having a validity period corresponding to a rental agreement associated with the renter. A similar access credential 122B could also be issued to a device 130B belonging to a cleaner to grant temporary access. When the delegate server 130A issues a credential 122B, server 130A may provide a corresponding notification to owner device 120 in accordance with a policy 134.

In private use case 200D, a second delegate server 130B is employed to share an additional access credential 122C. For example, a vehicle owner may purchase a product via an online retailer and want a delivery service to place the product in the vehicle's trunk. To facilitate this delivery, owner device 120 may share an access credential 122A including a private credential class 202 to a first delegate server 130A associated with the online retailer. The first delegate server 130A may store a policy 134 indicating it is permitted to share credentials 122B with a second delegate server 130B associated with a particular delivery service that has a preestablished agreement with the online retailer. Based on this policy 134, the first delegate server 130A may share a corresponding access credential 122, which may include an SBFD certificate 124B associated with the online retailer and identifies credential 122 as having private credential class 202. In response receiving the credential 122B, the second delegate server 130B may determine a policy 134 that indicates server 130B is permitted share credentials 122C with limited access to the vehicle such as accessing just the trunk. Delegate server 130B may then issue a credential 122C in accordance with the policy 134 to a device 130C associated with the delivery driver, which can use the credential 122C to open the vehicle's trunk and deposit the purchased product. In some embodiments, devices 130A-C may include respective policies 134 indicating that they are supposed to provide information to a remote server about the sharing events of credentials 122B and 122C and the eventual use of credential 122C, so that the owner device 120 can receive push notifications keeping the owner abreast of the various events associated with the package delivery.

Figure 3:
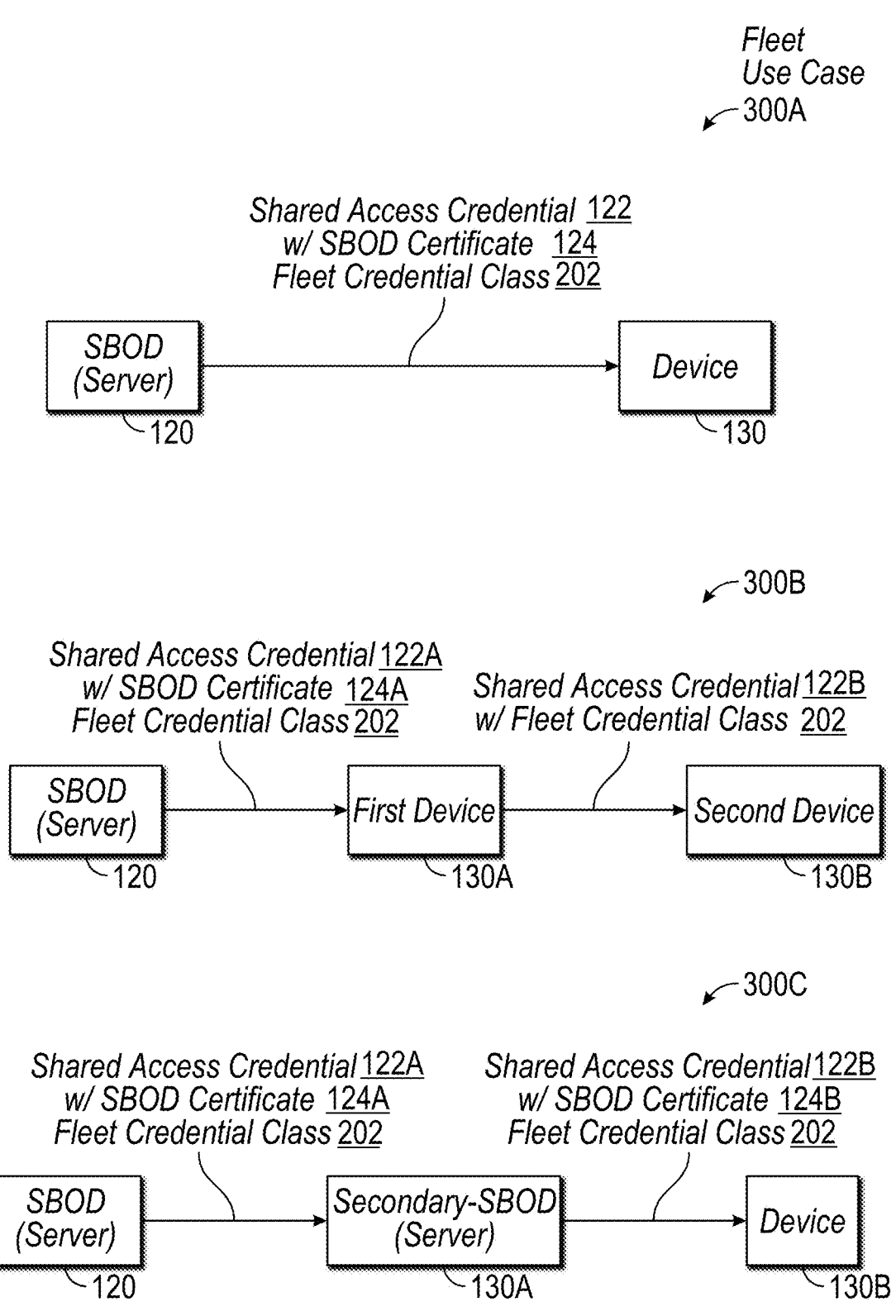
FIG. 3 is a block diagram illustrating examples of fleet use cases associated with the credential sharing system.

Turning now to FIG. 3, various examples of fleet use cases 300 are shown. In some embodiments, fleet use cases 300 pertain to cases in which an owner device 120 is associated with a fleet owner operating multiple accessible systems 110. In other embodiments, however, techniques described with respect to use cases 300 may be applicable to use cases in which the owner is not a fleet operator. In some embodiments, use cases 300 may be implemented differently than shown.

In fleet use case 300A, an SBOD 120 shares an access credential 122 for one of its systems 110 to a device 130. Such a use case 300A may be applicable to a company that wants to share credentials 122 to employees to access various ones of its facilities, vehicles, etc. Use case 300A may also be applicable to a rental provider granting access to hotels, vehicles, etc. As shown, the provided credential 122 may include an SBOD certificate 124 and indicate that its class 202 is a fleet credential class. Based on this information, device 130 may determine a corresponding policy 134 and perform actions in accordance with the policy 134. In some embodiments, these actions may include presenting a particular user interface such as one with the company's/rental provider's logo and other relevant information. In some embodiments, these actions include providing information obtained from the system 110. For example, in the case of a vehicle rental, device 130 may provide, to a remote server, the current millage of the vehicle at the start of the rental, the current fuel level of the vehicle, etc. in order to ensure that the renter is not overcharged when the vehicle is later returned.

In fleet use case 300B, an SBOD 120 issues a first access credential 122A to a first device 130A that shares a second access credential 122B to a second device 130B. Continuing with the rental example above, a user of device 130A may want to share a credential 122B to a second device 130B. In some embodiments, this device 130B may be a friend's device. In other embodiments, this device 130B may be another device belonging the renter such as a watch while device 130A is a phone. In response to receiving credential 122A, device 130A may determine a corresponding policy 134 and examine the policy 134 to determine whether sharing is authorized under the rental agreement. In this example, policy 134 may indicate that sharing is permissible based on the rental agreement as along as device 130A notifies a remote server associated with the rental provider. Based on this criterion, device 130A may share the credential 122B and provide information including, for example, information associated with the sharer device 130A (e.g., first anonymous device identifier) and information associated with the sharee device 130B (e.g., a second anonymous device identifier).

In fleet use case 300C, a root SBOD 120 issues a first shared access credential 122A to a second SBOD 130A that shares a second access credential 122B to a device 130. Such a use case 300C may be applicable to a company that operates a root SBOD 120 out of a central office but delegates authority to secondary SBODs 120 in local offices to share credentials 122B to particular employees' devices 130B. As shown, shared access credential 122A may include an SBOD certificate 124A associated with the central office and indicate a fleet credential class 202. Based on this shared credential 122A, the secondary SBOD 130A may determine a policy 134 relevant to that local office and share, to its employee devices 130 in accordance with its policy 134, credentials 122B that include a SBOD certificate 124B associated with the local office and indicating a fleet credential class 202. Employee devices 130B may determine a policy 134 relevant to the local office and perform actions in accordance with the policy 134. As another example, a manufacturer of system 110 may operate root SBOD 120 while a rental provider having an agreement with the manufacturer may operate secondary SBOD 130A to share credentials 122B with renters' devices 130B. As yet another example, a rental provider may operate root SBOD 120 while a company having an agreement with the rental provider may operate a second SBOD 130A to share credentials with its employee devices' 130B. As still another example, a rental car may be used for a trunk delivery in which the user can go to a rental provider application associated with server 120 and delegate delivery authority to a delivery service associated with server 130A for trunk delivery.

An exchange in which a sharee 130 receives an access credential 112 from a sharer 120 will now be discussed.

Figure 4:
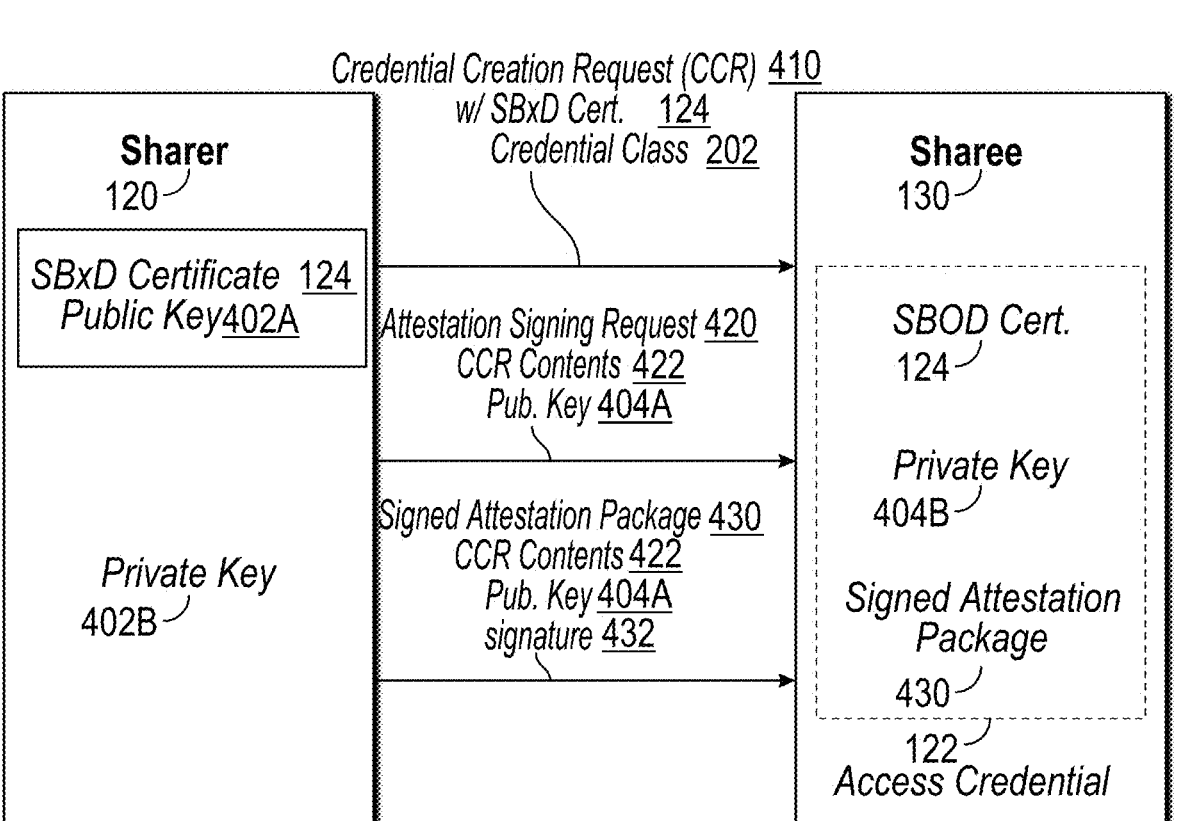
FIG. 4 is a block diagram illustrating an example of a credential sharing exchange between devices in the system.

Turning now to FIG. 4, a block diagram of a credential sharing exchange 400 is depicted. In various embodiments, credential sharing exchange 400 may be performed to cryptographically link keys 402 trusted by access system 110 to keys 404 established by sharee 130 in order to establish that sharee 130 has been authorized access by sharer 120. In the illustrated embodiment, credential sharing exchange 400 includes a credential creation request (CCR) 410, attestation signing request 420, and signed attestation package 430. In other embodiments, exchange 400 may be implemented differently than shown. For example, exchange 400 may be initiated from sharee 130; messages 410, 420, and 430 may be conveyed via a third-party such as a relay server; etc.

As shown, exchange 400 may begin with sharer 120 sending CCR 410 to sharee 130, which may be performed in response to a user input in sharer 120. In the illustrated embodiment, request 410 includes the sharer's SBxD certificate 124 and credential class 202. SBxD certificate 124 includes a public key 402A corresponding to private key 402B and forming a public key pair used to share credential 122. In some embodiment, request 410 may include additional information such as additional certificates in the chain that certified certificate 124, additional metadata about credential 122 such as various entitlements/restrictions associated with credential 122, etc. In response to receiving CCR 410, sharee 130 may verify request 410 including certificate 124. In some embodiments, the verification may include determining whether sharee 130 includes a relevant policy 134 associated with the SBxD certificate 124 in order to confirm that sharee 130 is authorized to accept a credential 122 from sharer 120. For example, sharee 130 may include a policy 134 that includes a criterion to not accept credentials 122 received outside of a particular geographic region, a criterion to not accept credentials 122 from an untrusted relay server, etc. The verification may also include confirming that a user of sharee 130 accepts any conditions specified in CCR 410. If the verification is successful and CCR 410 is accepted, sharee 130 may generate a new public key pair 404 and store the private key 404B and the SBxD certificate 124 as part of access credential 122. In some embodiments, sharee 130 may further certify the pair 404 by signing a certificate using a private key associated with a certificate that identifies sharee 130 as intermediate certificate authority as will be discussed with FIG. 5.

Sharee 130 may then respond by sending an attestation signing request 420 for the public key pair 404. In the illustrated embodiment, request 420 includes the public key 404A of pair 404 and CCR contents 422 from CCR 410 to be bound to key 404A. In some embodiments, CCR contents 422 includes the entirety of CCR 410; in other embodiments, contents 442 includes only a portion of CCR 410 such as a signature of certificate 124, credential class 202, credential restrictions, other contents not included in certificate 124, etc. In response to receiving request 420, sharer 120 may verify the request 420 including confirming that CCR contents 422 in request 420 match those included in CCR 410.

If the verification is successful, sharer 120 may respond by sending a signed attestation package 430. In the illustrated embodiment, package 430 includes CCR contents 422, public key 404A, and signature 432 generated over the contents of package 430 and using private key 402B. In some embodiments, package 430 may be a certificate, which may (or may not) be X.509 compliant. In response to receiving package 430, sharee 130 may perform a verification of package 430 using signature 432 and public key 402A included in certificate 124. If the verification is success, sharee 130 may store signed attestation package 430 as part of access credential 122. In some embodiments, this storing includes storing the contents of access credential 122 in a secure element such as discussed below with FIG. 7. When credential 122 is later used to authenticate to system 110, sharee 130 may performing a challenge response exchange with system 110 that includes presenting the contents of credential 122 (excluding private key 404B) and a signature generated using private key 404 and generated from a challenge issued by system 110.

As alluded to above, certificate 124 may not be a root certificate but rather is issued as part of a certificate chain forming a chain of trust from a trusted root authority (or authorities). One example of this chain will be discussed next.

Figure 5:
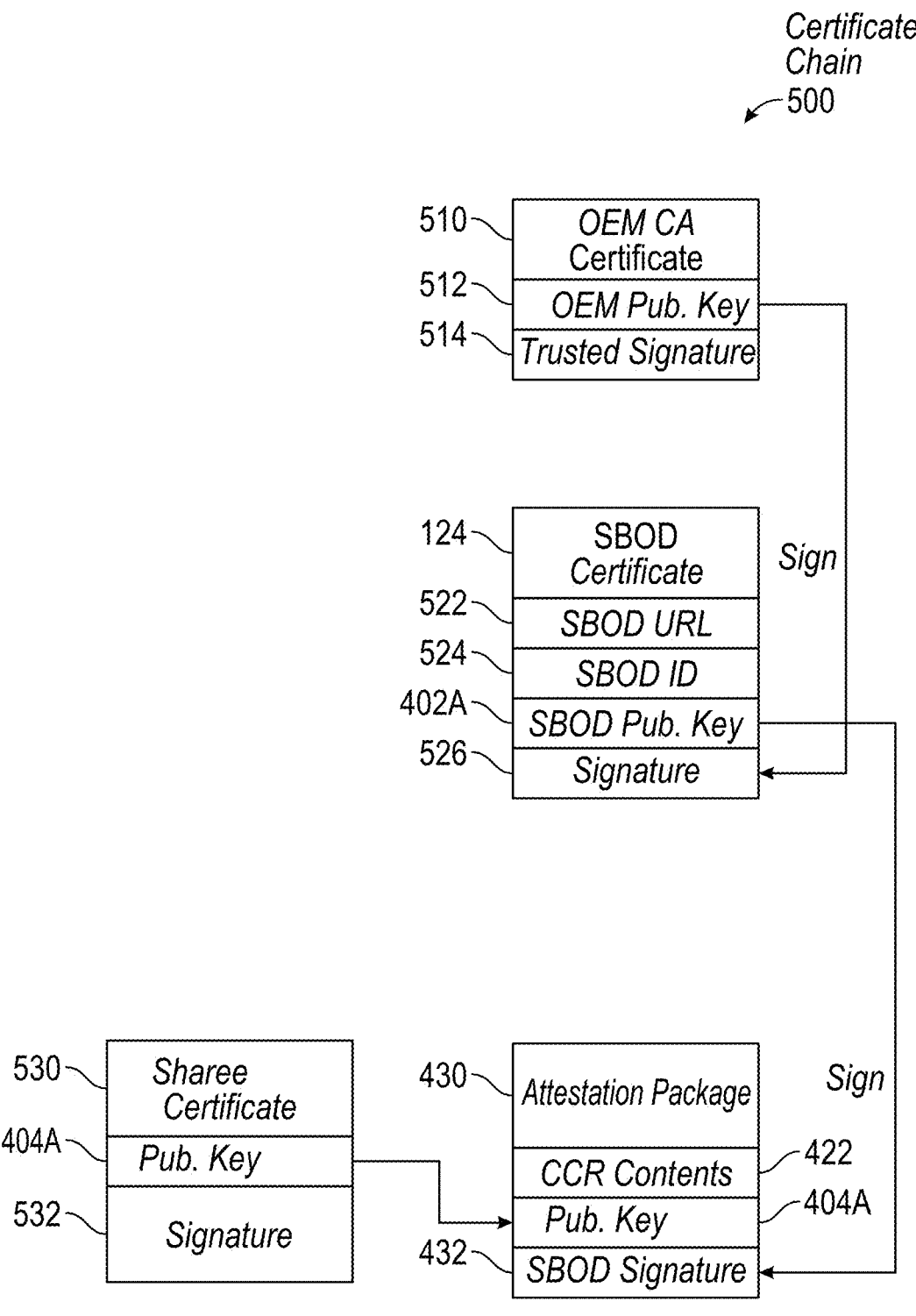
FIG. 5 is a block diagram illustrating an exemplary chain of certificates associated with sharing an access credential.

Turning now to FIG. 5, a block diagram of a certificate chain 500 is depicted. In the illustrated embodiment, chain 500 includes an OEM certificate authority (CA) certificate 510, SBOD certificate 124, sharee certificate 530, and attestation package 430. In some embodiments, chain 500 may be implemented differently than shown. For example, chain 500 may include additional SBxD certificates 124 (or certificates of private devices in some embodiments) if access credential 122 has been shared multiple times to other devices 130; chain 500 may also include higher level CA certificates used to issue certificates 510 and 530; certificates other than those depicted in FIG. 5 may be used; OEM CA certificate 510 may be a certificate held by some entity other than a manufacturer such as a fleet operator, SBxD service provider, etc. As will be discussed, OEM CA certificate 510, SBOD certificate 124, and sharee certificate 530 form the basis for establishing that package 430 is trustworthy and may be verified by accessible system 110 as well as any devices 120 and 130 participating in the sharing of an access credential 122.

OEM CA certificate 510 is a certificate belonging to a manufacturer of accessible system 110. As shown, certificate 510 may include an OEM public key 512 and a trusted signature 514 generated by a private key (not shown) over certificate 510's contents. In some embodiments, if certificate 510 is a root certificate, the private key may be included a public key pair with public key 512. In other embodiments, the private key may belong a higher-level CA not shown in FIG. 5. In some embodiments, accessible system 110 may be provisioned at manufacture with certificate 510 (and SBOD certificate 124 in some embodiments)—and thus identify certificate 510 as being from a trusted source. In some embodiments, the private key corresponding to public key 512 may reside on a server implementing a CA for the manufacturer of system 110 to certify public keys for server-based devices 120 and 130 (and private devices 120 and 130 in some embodiments).

SBOD certificate 124, in the illustrated embodiment, is certified using OEM CA certificate 510—i.e., the private key associated with certificate 510 is used to generate signature 526 from the other contents included in certificate 124 such that certificate 124 can be subsequently verified using public key 512 and signature 526. As shown, certificate 124 may include a URL 522 associated with sharer 120 (or sharee 130 in an SBFD certificate 124) and an identifier 524. In some embodiments, URL 522 may be used to identify a relay server facilitating exchange 400. In some embodiments, URL 522 may be used to download a corresponding policy 134 (or obtain additional information associated with credential 122). In various embodiments, identifier 524 is a unique identifier (UID) that uniquely identifies a server-based device 120 or 130. In some embodiments, identifier 524 may be used to determine a corresponding policy 134 for access credential 122 (and, in some embodiments, determine where to obtain policy 134). In some embodiments, certificate 124 may include additional contents such as a unique identifier of system 110, a random number, metadata identifying a revocation method, etc. In some embodiments, SBxD certificates 124 may also be used to establish a secure connection for exchange 400 such as one using Transport Layer Security (TLS).

Sharee certificate 530, in the illustrated embodiment, is a certificate including public key 404A and certifying public key pair 404 discussed above. In some embodiments, certificate 530 is created by sharee 130 acting as an intermediary CA using an intermediate CA certificate (not shown) that may be issued to sharee 130 by a trusted authority, which may be a manufacturer of sharee 130 or system 110—or is some other trusted authority. Accordingly, signature 532 may be generated using the private key corresponding to this intermediary CA certificate. In other embodiments, certificate 530 may be obtained differently. For example, certificate 530 may include a credential class 202 associated with package 430.

Attestation package 430, in the illustrated embodiment, includes public key 404A and CCR contents 422 and is certified using certificate 124—i.e., private key 402B is used to generate signature 432 from the other contents included in package 430. As noted above, access credential 122 may include attestation package 430 and certificate 124. In some embodiments, credential 122 may further include one or more of certificates 510, 530, or any other certificates (not shown) in chain 500; in other embodiments, accessible system 110 may include one or more of these certificates such that sharee 130 can authenticate with system 110 without providing them.

Figure 6:
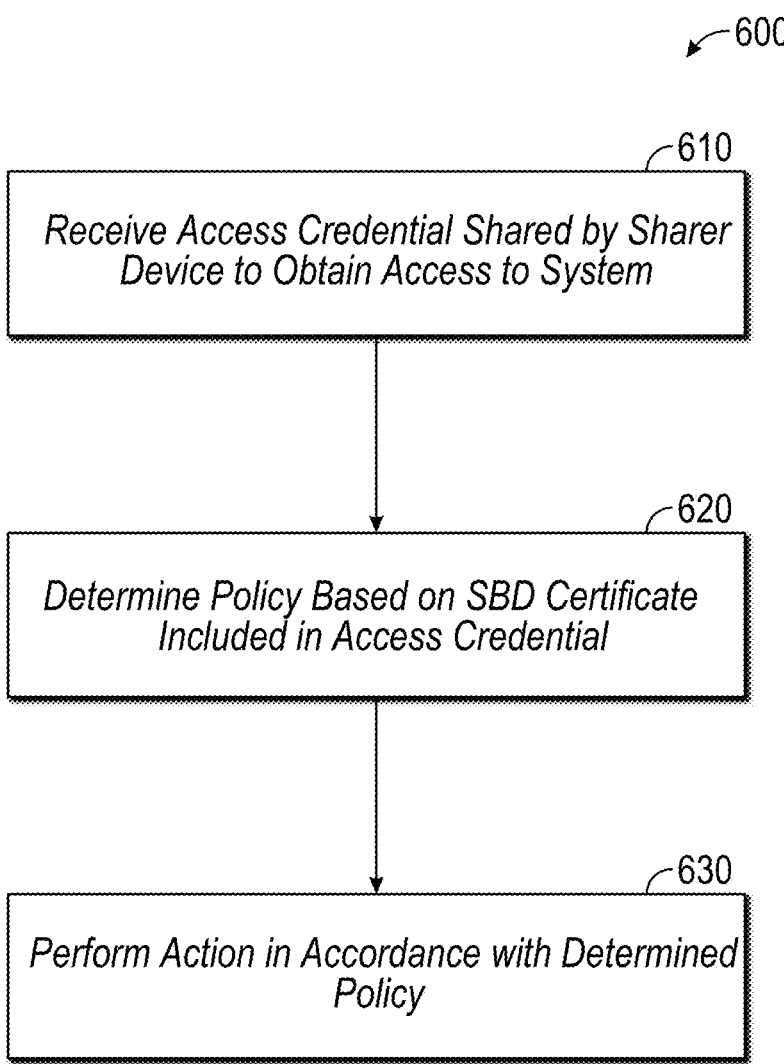
FIG. 6 is a flow diagram illustrating an example of a method for sharing an access credential.

Turning now to FIG. 6, a flow diagram of a method 600 is depicted. Method 600 is one embodiment of a method that may be performed by a device receiving a shared credential such as sharee 130. In some instances, performance of method 600 may improve the experience of the user associated with the shared credential.

In step 610, the sharee device receives an access credential (e.g., access credential 122) shared by a sharer device (e.g., sharer 120) to obtain access to a system (e.g., accessible system 110). In some embodiments, the access credential is received from the sharer device via a relay server. In some embodiments, the system is a vehicle.

In step 620, the sharee device determines a policy (e.g., policy 134) based on a server-based owner device (SBD) certificate (e.g., SBxD certificate 124) included in the access credential. In various embodiments, the SBD certificate includes an identity (e.g., SBxD identifier 524) of the sharer device indicative that the sharer device is a delegate server (e.g., delegate server 130A or 130B in FIG. 2) authorized by an owner device (e.g., owner device 120 in FIG. 2) of the system to grant limited access to the system. In such an embodiment, determining the policy includes, based on the included identity in the SBxD certificate, determining a policy associated with the delegate server. In various embodiments, the access credential includes a signed attestation package (e.g., signed attestation package 430) for a public key pair (e.g., public key pair 404) associated with the sharee device; the attestation package is signed by the sharer device using a private key (e.g., private key 402B) corresponding to a public key (e.g., public key 402B) included in the SBOD certificate. In some embodiments, method 600 further includes the sharee device generating the public key pair associated with the sharee device and submitting a public key (e.g., public key 404A) of the public key pair in an attestation signing request (e.g., attestation signing request 420) to the sharer device to obtain the signed attestation package. In some embodiments, the signed attestation package includes class information (e.g., credential class 202) to restrict how the sharee device shares the access credential to another device.

In step 630, the sharee device performs an action in accordance with the determined policy. In some embodiments, the action includes presenting a particular user interface in accordance with the policy. In some embodiments, the policy specifies a restriction for a particular geographic region; the action includes determining whether to accept the access credential based on whether the access credential is associated with the particular geographic region. In some embodiments, the policy specifies whether the sharee device is permitted to share the access credential with another device; the action includes sharing the access credential based on the policy. In some embodiments, the policy specifies a restricted set of access rights for the system; the action includes presenting, in accordance with the policy, the access credential to the system. In some embodiments, the action includes performing, with the system, a challenge response exchange that includes using a private key (e.g., private key 404B) of the access credential to sign a challenge issued by the system. In some embodiments, the SBD certificate is a first SBD certificate (e.g., SBOD certificate 124A in FIG. 3) associated with the sharer device. In such an embodiment, the action includes obtaining a second SBD certificate (e.g., SBOD certificate 124B) associated with the sharee device and sharing, to another device, an access credential (e.g., access credential 122B) that includes the second SBD certificate. In various embodiments, the performed action includes using the public key pair, the signed attestation, and SBD certificate to authenticate the sharee device to the system. In some embodiments, the action includes sharing, based on the class information, the access credential with the other device.

In various embodiments, the action includes providing information to a remote server. In some embodiments, the provided information includes an identity associated with the sharer device. In some embodiments, the provided information includes information about an access event using the shared access credential. In some embodiments, the provided information includes information associated with the sharee device. In some embodiments, the action further includes sharing the access credential with another device, and the provided information includes information associated with the other device. In some embodiments, the provided information includes information obtained from the system.

In some embodiments, steps 620 and 630 include identifying an access credential class (e.g., credential class 202) defined by class information included in the access credential and performing an action in accordance with the determined policy and the identified access credential class. In some embodiments, the access credential class is associated with a rental provider access credential; the action is an action associated with usage of a system managed by the rental provider. In some embodiments, the rental provider is a vehicle rental provider. In some embodiments, the rental provider is a hotel. In some embodiments, the policy includes criteria associated with a rental agreement.

Exemplary Computer System

Figure 7:
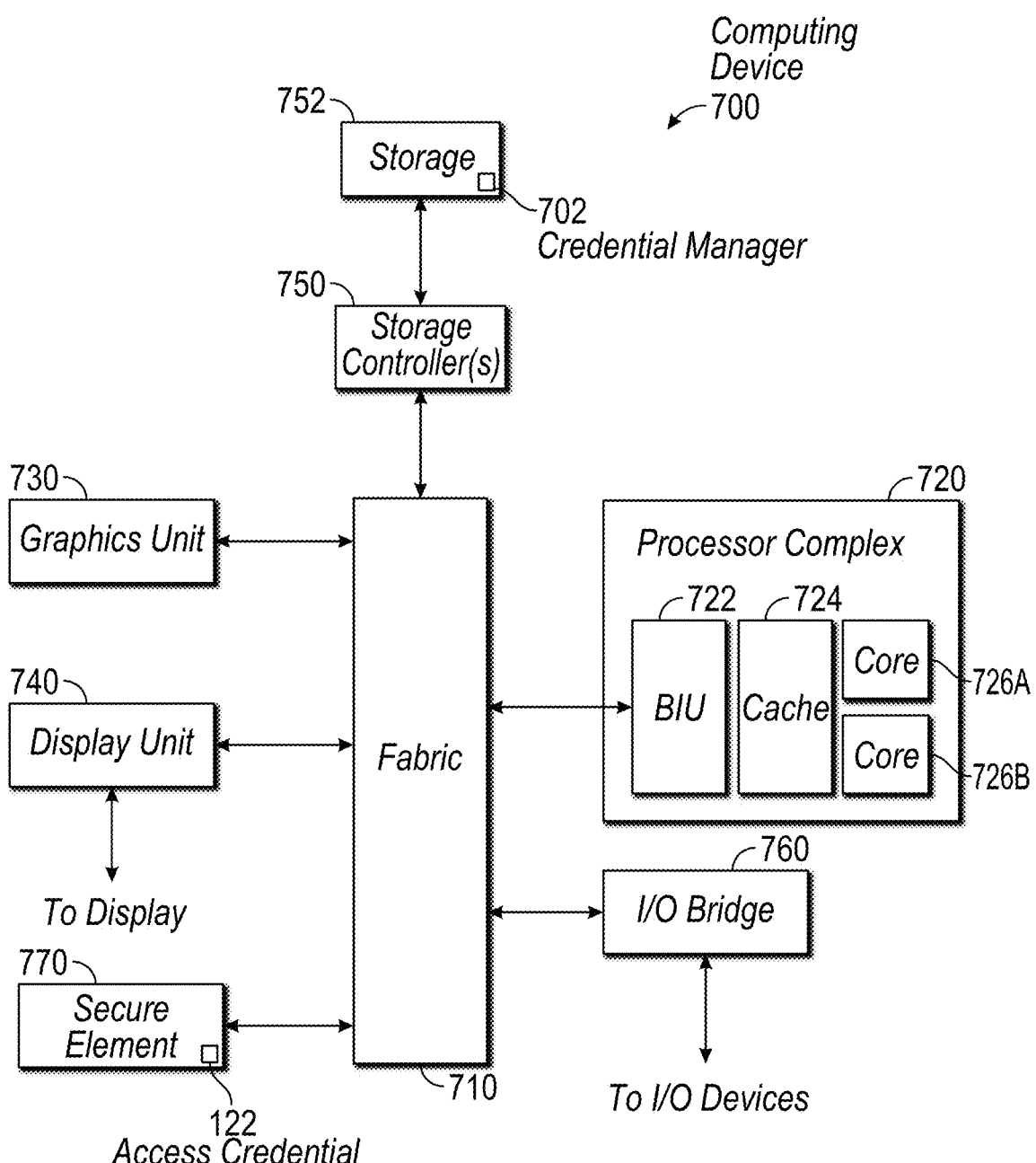
FIG. 7 is a block diagram illustrating an exemplary computing device, which may implement one or more components of the authentication.

Turning now to FIG. 7, a block diagram illustrating an exemplary embodiment of a computing device 700, which may implement functionality of accessible system 110, sharer 120, or sharee 130, is shown. Device 700 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 700 includes fabric 710, processor complex 720, graphics unit 730, display unit 740, cache/memory/storage controller 750, input/output (I/O) bridge 760, secure element 770. In some embodiments, elements of device 700 may be included within a system on a chip (SOC).

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. As used herein, the term "coupled to" may indicate one or more connections between elements, and a coupling may include intervening elements. For example, in FIG. 7, graphics unit 730 may be described as "coupled to" a memory through fabric 710 and cache/memory controller 750. In contrast, in the illustrated embodiment of FIG. 7, graphics unit 730 is "directly coupled" to fabric 710 because there are no intervening elements.

In the illustrated embodiment, processor complex 720 includes bus interface unit (BIU) 722, cache 724, and cores 726A and 726B. In various embodiments, processor complex 720 may include various numbers of processors, processor cores and/or caches. For example, processor complex 720 may include 1, 2, or 4 processor cores, or any other suitable number. In one embodiment, cache 724 is a set associative L2 cache. In some embodiments, cores 726A and/or 726B may include internal instruction and/or data caches. In some embodiments, a coherency unit (not shown) in fabric 710, cache 724, or elsewhere in device 700 may be configured to maintain coherency between various caches of device 700. BIU 722 may be configured to manage communication between processor complex 720 and other elements of device 700. Processor cores such as cores 726 may be configured to execute instructions of a particular instruction set architecture (ISA), which may include operating system instructions and user application instructions. These instructions may be stored in computer readable medium such as a memory coupled to memory controller 750 discussed below.

Graphics unit 730 may include one or more processors and/or one or more graphics processing units (GPU's). Graphics unit 730 may receive graphics-oriented instructions, such as OPENGL®, Metal, or DIRECT3D® instructions, for example. Graphics unit 730 may execute specialized GPU instructions or perform other operations based on the received graphics-oriented instructions. Graphics unit 730 may generally be configured to process large blocks of data in parallel and may build images in a frame buffer for output to a display. Graphics unit 730 may include transform, lighting, triangle, and/or rendering engines in one or more graphics processing pipelines. Graphics unit 730 may output pixel information for display images.

Display unit 740 may be configured to read data from a frame buffer and provide a stream of pixel values for display. Display unit 740 may be configured as a display pipeline in some embodiments. Additionally, display unit 740 may be configured to blend multiple frames to produce an output frame. Further, display unit 740 may include one or more interfaces (e.g., MIPI® or embedded display port (eDP)) for coupling to a user display (e.g., a touchscreen or an external display).

Cache/memory/storage controller 750 may be configured to manage transfer of data between fabric 710 and one or more caches, memories, and/or storages 752. For example, cache/memory controller 750 may be coupled to an L3 cache, which may in turn be coupled to a system memory. In other embodiments, cache/memory controller 750 may be directly coupled to a memory. In some embodiments, cache/memory controller 750 may include one or more internal caches. Memory coupled to controller 750 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 750 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 720 to cause device 700 to perform functionality described herein. Accordingly, in the illustrated embodiment, storage 752 includes program instructions of a credential manager 702 executable to implement any of the various functionality described above with respect to shared access credential 122.

I/O bridge 760 may include various elements configured to implement universal serial bus (USB) communications, security, audio, and/or low-power always-on functionality, for example. I/O bridge 760 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 760. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc.

Secure element 770, in various embodiments, is a secure circuit configured to perform security sensitive services for computing system 10. As used herein, the term "secure circuit" refers to a circuit that protects an isolated, internal resource from being directly accessed by an external circuit such as processor complex 720 and other peripherals. This internal resource may be circuitry that performs services/operations associated with sensitive data such as cryptographic circuitry configured to perform encryption and decryption, key derivation, etc. This internal resource may be memory that stores sensitive data such as a supplied user credential, cryptographic keys, etc. Additionally, in some cases, a secure circuit may be said to be "tamper-resistant," which is a term of art referring to mechanisms that prevent compromise of the portions of the secure circuit that perform the one or more services. Accordingly, as shown in some embodiments, secure element 770 stores access credential 122 in a non-volatile storage, which may be internal to secure element 770. Secure element 770 may also perform one or more cryptographic operations described above with respect to access credential 122. For example, secure element 770 may perform, with accessible system 110, a challenge response exchange that includes using private key 404B of access credential 122 to sign a challenge issued by system 110. In some embodiments, secure element 770 includes a hardware public key accelerator (PKA) configured to generate a signature of the issued challenge, which may be generated in accordance with the digital signature algorithm (DSA).

Various embodiments described herein may gather and/or use data available from specific and legitimate sources to improve the sharing of access credentials. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to allow a delivery driver to identify a person's vehicle to place a package in the vehicle's trunk. Further, other uses for personal information data that benefit the user are also contemplated by the present disclosure. For instance, a user of a rental car may be able to seamlessly sign up friends and family in accordance with a rental agreement to receive respective access credentials.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in signing up for an access credential, the present technology can be configured to allow users to select to "opt in" or "opt out" of participation in the collection of personal information data during registration for services or anytime thereafter. In another example, users can select not to provide personal for rental or delivery services. In yet another example, users can select to limit the length of time personal data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, access credentials may be shared based on aggregated non-personal information data or a bare minimum amount of personal information, such as the content being handled only on the user's device or other non-personal information available to the rental or delivery services.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A non-transitory computer readable medium having program instructions stored therein that are executable by a sharee device to perform operations comprising:

receiving an access credential shared by a sharer device to obtain access to a system;

determining a policy based on a server-based device (SBD) certificate included in the access credential, wherein the SBD certificate identifies the sharer device as being a server and certifies a public key pair corresponding to an identity of the server, and wherein the policy defines one or more criteria restricting a set of actions permissible using the shared access credential, wherein the SBD certificate is one of:

a server-based owner device (SBOD) certificate that identifies the sharer device as a device belonging to an owner of the system; and a server-based friend device (SBFD) certificate that identifies the sharer device as a device belonging to an entity granted authority by the owner; and performing an action in accordance with the determined policy.

2. The computer readable medium of claim 1, wherein the action includes:

presenting a particular user interface in accordance with the policy.

3. The computer readable medium of claim 1, wherein the policy specifies a restriction for a particular geographic region; and wherein the action includes:

determining whether to accept the access credential based on whether the access credential is associated with the particular geographic region.

4. The computer readable medium of claim 1, wherein the policy specifies whether the sharee device is permitted to share the access credential with another device; and wherein the action includes:

sharing the access credential based on the policy.

5. The computer readable medium of claim 1, wherein the policy specifies a restricted set of access rights for the system; and wherein the action includes:

presenting, in accordance with the policy, the access credential to the system.

6. The computer readable medium of claim 1, wherein the action includes providing information to a remote server.

7. The computer readable medium of claim 6, wherein the provided information includes an identity associated with the sharer device.

8. The computer readable medium of claim 6, wherein the provided information includes information about an access event using the shared access credential.

9. The computer readable medium of claim 6, wherein the provided information includes information associated with the sharee device.

10. The computer readable medium of claim 6, wherein the action further includes:

sharing the access credential with another device, wherein the provided information includes information associated with the other device.

11. A method, comprising:

receiving, by a sharee device, an access credential shared by a sharer device to obtain access to a system;

determining, by the sharee device, a policy based on a server-based device (SBD) certificate included in the access credential, wherein the SBD certificate identifies the sharer device as being a server and certifies a public key pair corresponding to an identity of the server, and wherein the policy defines one or more criteria restricting a set of actions permissible using the shared access credential, wherein the SBD certificate is one of:

a server-based owner device (SBOD) certificate that identifies the sharer device as a device belonging to an owner of the system; and a server-based friend device (SBFD) certificate that identifies the sharer device as a device belonging to an entity granted authority by the owner; and performing, by the sharee device, an action in accordance with the determined policy.

12. The method of claim 11, further comprising:

identifying, by the sharee device, an access credential class defined by class information included in the access credential; and wherein performing an action in accordance with the determined policy includes:

performing an action in accordance with the determined policy and the identified access credential class.

13. The method of claim 12, wherein the access credential class is associated with a rental provider access credential; and wherein the action is an action associated with usage of a system managed by the rental provider.

14. The method of claim 11, wherein the SBD certificate includes an identity of the sharer device indicative that the sharer device is a delegate server authorized by an owner device of the system to grant limited access to the system; and wherein determining the policy includes:

based on the included identity in the SBD certificate, determining a policy associated with the delegate server.

15. The method of claim 11, wherein the access credential includes a signed attestation package for a public key pair associated with the sharee device;

wherein the attestation package is signed by the sharer device using a private key corresponding to a public key included in the SBD certificate; and wherein the performed action includes:

using the public key pair associated with the sharee device, the signed attestation package, and the SBD certificate to authenticate the sharee device to the system.

16. The method of claim 15, further comprising:

generating, by the sharee device, the public key pair associated with the sharee device; and submitting, by the sharee device, a public key of the public key pair in an attestation signing request to the sharer device to obtain the signed attestation package.

17. A sharee device, comprising:

one or more processors; and memory having program instructions stored therein that are executable by the one or more processors to cause the sharee device to perform operations including:

receiving an access credential shared by a sharer device to obtain access to a system;

determining a policy based on a server-based device (SBD) certificate included in the access credential, wherein the SBD certificate identifies the sharer device as being a server and certifies a public key pair corresponding to an identity of the server, and wherein the policy defines one or more criteria restricting a set of actions permissible using the shared access credential, wherein the SBD certificate is one of:

a server-based owner device (SBOD) certificate that identifies the sharer device as a device belonging to an owner of the system; and a server-based friend device (SBFD) certificate that identifies the sharer device as a device belonging to an entity granted authority by the owner; and performing an action in accordance with the determined policy.

18. The sharee device of claim 17, wherein the action includes:

performing, with the system, a challenge response exchange that includes using a private key of the access credential to sign a challenge issued by the system.

19. The sharee device of claim 18, wherein the operations further comprise:

storing the access credential in a secure element configured to use the private key to generate a signature of the issued challenge.

20. The sharee device of claim 17, wherein the system is a vehicle.

* * * * *